INVENTOR.
WOLFGANG SUNDERMEYER

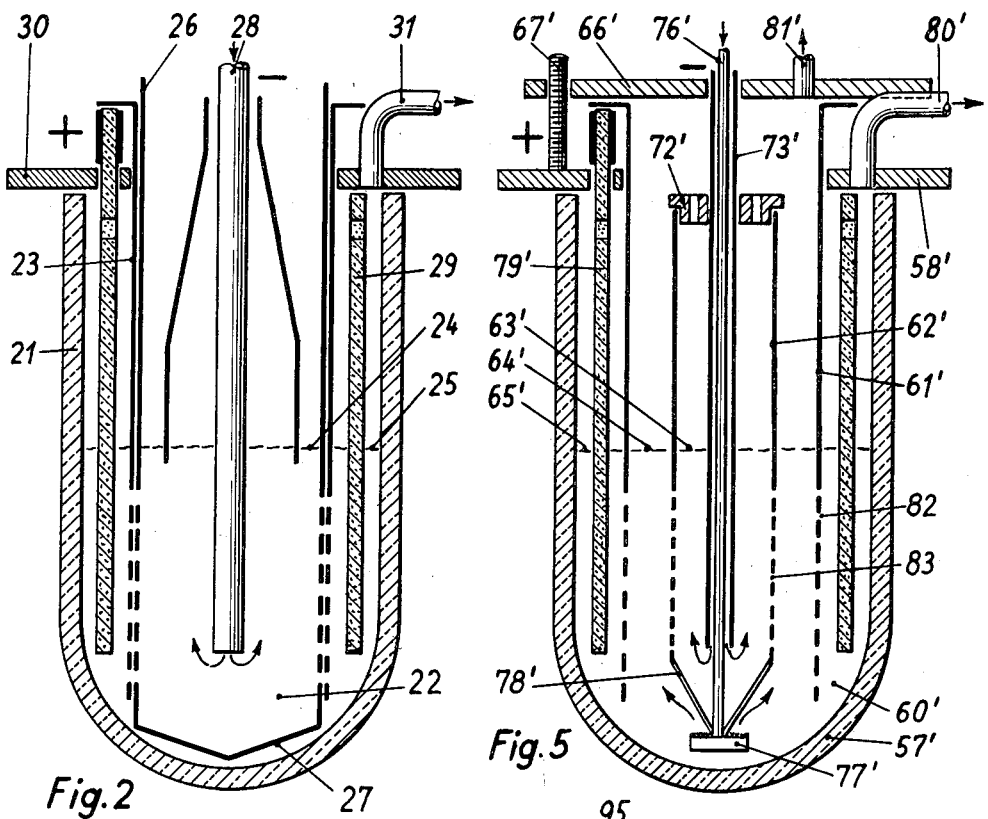
Fig. 2
Fig. 5
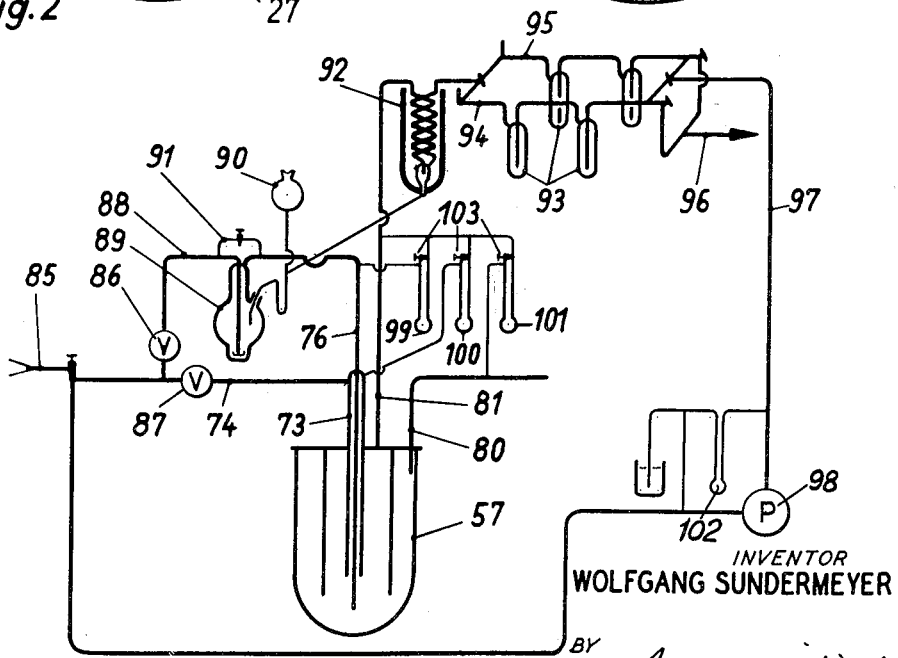
Fig. 6
INVENTOR
WOLFGANG SUNDERMEYER
BY
ATTORNEY

Feb. 19, 1963 W. SUNDERMEYER 3,078,218
HYDROGENATION OF HALOGEN COMPOUNDS OF ELEMENTS OF
GROUPS III AND IV OF THE PERIODIC SYSTEM
Filed Aug. 4, 1958 4 Sheets-Sheet 4

INVENTOR
WOLFGANG SUNDERMEYER
BY
ATTORNEY 3,078,218
HYDROGENATION OF HALOGEN COMPOUNDS OF ELEMENTS OF GROUPS III AND IV OF THE PERIODIC SYSTEM
Wolfgang Sundermeyer, Gottingen, Germany, assignor to Union Carbide Corporation, a corporation of New York
Filed Aug. 4, 1958, Ser. No. 753,027
9 Claims. (Cl. 204—61)

This invention relates to a process and apparatus for the hydrogenation of halogen compounds of elements of groups III and IV of the periodic system. More particularly, this invention relates to a process and apparatus for the production of hydrides such as silane, diborane, germane, their stable derivatives, and hydrogen compounds of lead and tin.

Silane has been prepared by the decomposition of a silicide with an acid, such as sulfuric acid. It has also been produced by decomposing a silicide in liquid ammonia with ammonium bromide as an acid component. These processes cannot be carried out continuously but must be done in small batches. Furthermore, the silicides are expensive and a regeneration of the by-products formed is difficult.

It is also known to convert silicon chloride to silane by lithium aluminum hydride ($LiAlH_4$) in an ether solution. Similar drawbacks are presented as in the processes referred to above. The low price of $SiCl_4$ is counterbalanced by the high price of $LiAlH_4$.

Similar difficulties have been experienced in the preparation of diborane and germane and their stable derivatives.

It is an object of this invention to provide an efficient and economical process for the production of hydrides of elements of groups III and IV of the periodic system.

It is another object of this invention to provide a process for the hydrogenation of halides of elements of groups III and IV of the periodic system.

It is a further object of this invention to provide an apparatus for the hydrogenation of halides of elements of groups III and IV of the periodic system.

Other objects and advantages of the invention will become apparent from the following description and appended claims.

According to the present invention, a halide of an element of group IIIA or IVA of the periodic system is mixed with the hydride of an alkali or alkaline earth metal in a melt of a nonoxidizing salt or mixture of salts to produce the hydride of the element and an alkali or alkaline earth halide.

The simple hydrides of the alkali and alkaline earth metals, obtainable at relatively low cost, generally dissolve in nonoxidizing salt melts 100 percent. This assures an efficient and rapid exchange of hydrogen and halogen atoms and large amounts of the desired hydrogenated final product can be produced quite economically.

Another important advantage of this invention is that the alkali or alkaline earth halide formed in the reaction can be readily reconverted to an alkali or alkaline earth hydride by separating the halogen and metal by electrolysis and then reacting the metal with hydrogen. By using the liberated halogen to produce the starting compound, it is necessary to add only those elements which form the final product, for example, $Si+2H_2$ to produce $SiH_4$. That is, the process may be operated continuously so that it is not necessary to add additional alkali or alkaline earth metal or halogen. Furthermore, the hydride ions formed in the melt of alkali or alkaline earth hydride can be moved through an electric field along a definite path to the starting compound to be hydrogenized while the halogen and alkali or alkaline earth metal are being set free at the electrodes.

It is advantageous to use a melt which consists of a proportion of alkali or alkaline earth halide equal to that formed during the reaction so the melt is substantially unchanged by the by products formed in the reaction. Furthermore, the desired hydride can be produced directly from the original melt by electrolysis and the addition of hydrogen. Also, the melt can consist of a eutectic of two or more salts whereby its melting point can be lowered as some hydrogenated final products produced by this process are unstable at elevated temperatures. It is preferable to select the salts of the melt so that the desired alkali or alkaline earth metal can be set free at the operating temperature.

Lithium is a preferred hydrogen carrier in this invention. Among other advantages, it floats on most of the melts that can be used and thus can be reacted readily with the hydrogen which rises in the melt. Also, lithium can be more readily hydrogenated (heat of formation is 22 kilocalories per mol) than other alkali metals. Furthermore, lithium hydride is the most thermally stable hydride in its series and does not escape from the melt by volatilization to any great extent.

A melt of lithium chloride and potassium chloride is recommended where the starting material is a silicon halide.

This invention can also be used for the direct production of chlorosilane. Silicon tetrachloride can be reacted with lithium hydride in the melt in a molar ratio of less than four to one. It was formerly necessary to produce silane and then chlorinate it.

For the preparation of diborane, boron bromide can be reacted with lithium hydride in the melt.

The process need not be carried out continuously. The starting compound to be hydrogenated can be passed through a vessel of the melt in which the alkali metal is dissolved until all the hydride has been consumed. The alkali or alkaline earth halide can then be decomposed electrolytically and the metal reacted with hydrogen to form the hydride again. Thereupon the process can be repeated.

For continuous operation of this invention, it is preferable to use apparatus comprising a heated vessel for containing the liquid salt melt subdivided so that the surface of the melt is in two separate zones. A cathode can project beneath the surface of the melt in one zone and an anode beneath the surface of the other. There can be one or more inlet pipes for feeding hydrogen and the starting compound to be hydrogenated into the zone in which the cathode is, and an outlet above the melt in this zone for the removal of the hydrogenated product.

There can also be means for periodically separating the liquid melt below the surface of the two zones so that the melt in either zone is separate from that in the other zone. This separation can be accomplished by means of a mechanical device, for example, a perforated partition, the perforations of which can be covered by the relative displacement of a similarly perforated adjacent partition, or the melt between the two zones can be temporarily solidified by a cooling device.

For economical production of large amounts of hydrogenated product the hydrogenation and alkali or alkaline earth metal hydride reformation should be carried out simultaneously. A device particularly suitable for this purpose is essentially a heated vessel for holding the liquid salt melt having compartments arranged so that the surface of the melt is subdivided into three separate zones. A cathode can extend beneath the surface of the first zone, an anode can extend beneath the surface of the second zone and an outlet can be located above the surface of the melt in the third zone to carry away the final hydrogenated product. A hydrogen supply inlet is located beneath the surface of the first zone. The starting compound to be hydrogenated is conducted into the melt so as to strike the path of the hydride ions formed in the melt, which are migrating towards the anode, and the reaction product rises up in the third zone and is carried away by the outlet.

The vessel used in this particular embodiment of the invention has three upwardly pointing legs. A supply line for introducing the starting material to be hydrogenated is located beneath the leg in which the final hydrogenated product is to be collected. This leg can expand downward in a funnel-like manner.

An alternative arrangement would comprise a circular vessel with two concentric partitions extending from the top of the vessel downward into the melt and subdividing the surface of the melt into two outer annular zones and an inner circular zone. A concentric supply line can be used in the inner circular zone to introduce the starting compound beneath the surface of the melt.

Partitions in the vessels described should extend down to near the bottom of the vessels but passages should be provided in the partitions to shorten the current path between the anode and cathode so that a relatively low potential is sufficient. The partitions around the cathode zone should be of iron, low-carbon steel, tantalum, molybdenum or tungsten since the alkali and alkaline earth metals liberated in the electrolysis are very corrosive. Lithium is particularly corrosive in this respect.

Protection from corrosion may also be accomplished by direct or indirect cooling of the partition around the cathode zone so that it becomes coated with solidified melt. Cooling may be done by a copper tube extending into the melt and cooled at tis upper end. The separating partition itself may also be cooled.

Where larger vessels are used, cooling coils containing water, for example, may be extended into the melt.

It is desirable to use a hollow cathode and pass the hydrogen into the melt by means of a passage within the cathode.

The invention will now be more particularly described by reference to the drawings.

FIG. 2 is a cross-sectional, elevation view of a cylindrical, partitioned vessel for carrying out the invention.

FIG. 5 is a cross-sectional, elevation view of a modified form of the vessel shown in FIG. 4 which can be used for continuous operation.

FIG. 6 is a schematic drawing of substantially all the apparatus needed to carry out the process.

Figure 1:
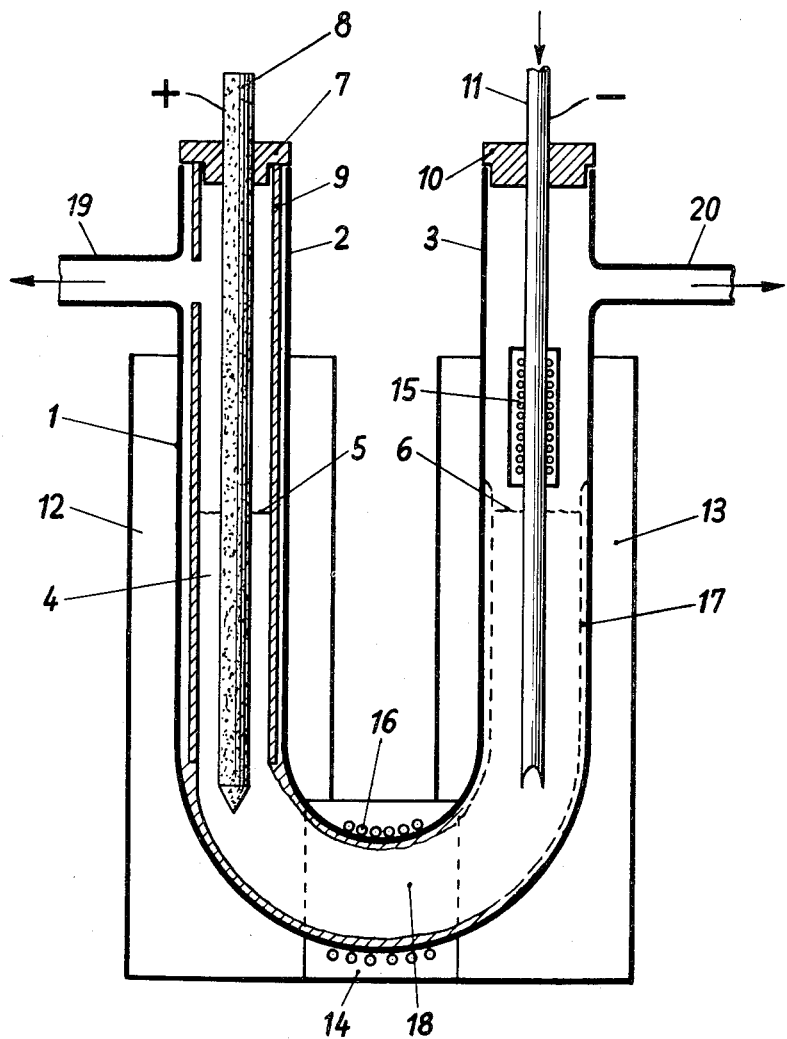
FIG. 1 is a cross-sectional, elevation view of a two-legged apparatus for carrying out the invention.

The apparatus shown in FIG. 1 is designed for semi-continuous operation. It comprises a U-shaped steel tube 1 with legs 2 and 3. The melt 4 is introduced into tube 1 to form the surface zone 5 in leg 2 and zone 6 in leg 3. A graphite anode 8 is held by cap 7 in leg 2 and this leg is lined with a ceramic tube 9. The iron tube 11 is the cathode. It is held in leg 3 by the hinged cover 10.

A heater 12 encompasses leg 2 and heater 13 encompasses leg 3. Heater 14 encompasses the part of the tube connecting the two legs. A heater 15 surrounds the tube 11 to heat the melt inside the tube. Heat is carried down to the melt by conduction.

A cooling device 16 is provided around the area 18 between the legs to solidify the melt between the legs, thereby separating the cathode zone from the anode zone.

Outlets 19 and 20 in legs 2 and 3, respectively, carry away the gaseous products formed in the legs.

Direct current is applied to the electrodes to cause fusion electrolysis. The alkali or alkaline earth metal formed floats on the surface zone 6. Then the cooling device 16 is used to solidify the area 18 of the vessel so as to separate the two legs.

Hydrogen is passed into the melt through the hollow cathode 11 and the hydride of the previously freed alkali or alkaline earth metal is formed. Then the starting compound to be hydrogenated, for example, silicon chloride, is passed into the melt in gaseous form through the cathode 11. Hydrogen may be used as a carrier. The compound reacts with the metal hydride and the final hydrogenated product is produced. The excess hydrogen and the hydrogenated product are removed through outlet 20. Following consumption of the alkali or alkaline earth hydride, the cooling device 16 is turned off to allow the area 18 to melt and electrolysis is again used to liberate the alkali or alkaline earth metal from the halide. The halogen liberated at the anode passes out of the vessel through outlet 19.

In FIG. 2, a ceramic vessel 21 of circular cross-section disposed within a heating device (not shown) is filled with melt 22. A tubular tantalum partition 23 divides the surface of the melt into a circular inner zone 24 and an annular outer zone 25. The partition 23 has holes in the portion beneath the surface of the melt and may be protected by a ceramic material on its outside. A second tantalum tube 26 with a closed bottom 27 is positioned within tube 23 and has holes corresponding to those of tube 23. Tube 26 is axially displaceable so as to close the holes and create two entirely separate zones of melt.

A tubular iron cathode 28 extends into the melt in the inner zone. Hydrogen and the starting compound to be hydrogenated are passed through the cathode as explained in the description of FIG. 1. An annular graphite anode 29 is immersed in the outer annular melt zone 25 and is held by the cover 30 of the vessel 21. The outlet 31 carries away the halogen freed during electrolysis.

This apparatus operates similarly to that of FIG. 1, but in this case the separation of the two melting ranges is accomplished mechanically by displacing the inner tube 26.

Figure 3:
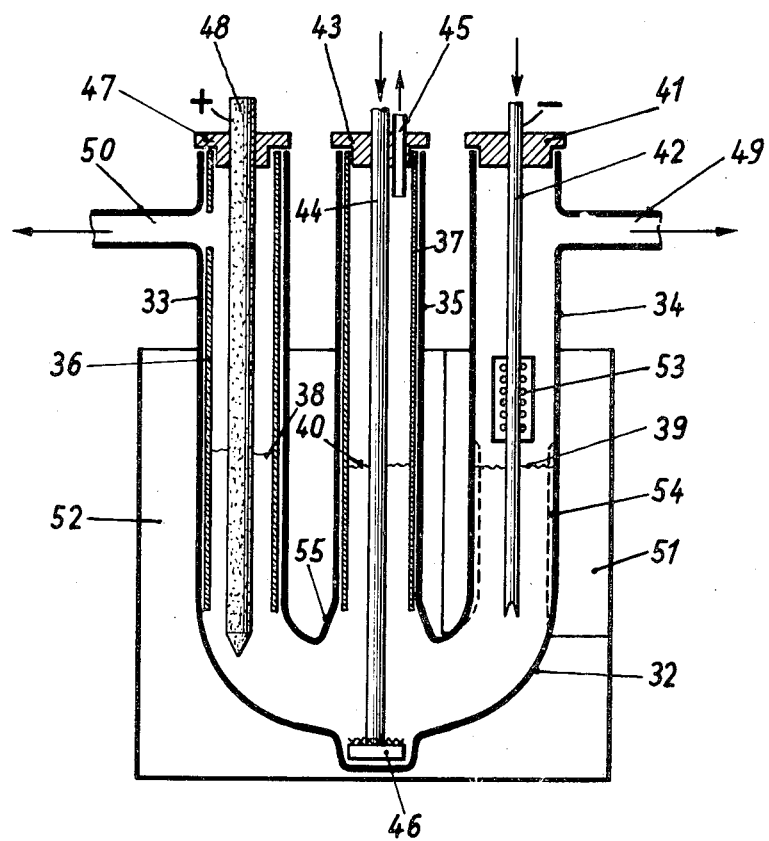
FIG. 3 is a cross-sectional elevation view of a three-legged vessel for carrying out the process continuously.

The apparatus of FIG. 3 is designed for continuous operation. The container 32 of steel or iron has three legs, 33, 34 and 35. The legs 33 and 35 have ceramic linings 36 and 37, respectively. The melt in legs 33, 34 and 35 forms the surface zones 38, 39 and 40, respectively. A cap 41 closes leg 34 and holds tubular iron cathode 42 through which hydrogen is supplied. The central leg 35 is closed by cap 43 which holds tube 44 through which the starting compound to be hydrogenated is passed. Discharge tube 45 in cap 43 is used to remove the final hydrogenated product. The supply tube 44 terminates at the bottom of the container at feeding frit 46. The leg 33 is closed by cap 47, which holds the graphite anode 48. Outlet 50 in leg 33 is used to remove the halogen liberated during electrolysis. The outlet 49 in leg 34 carries away excess hydrogen.

Leg 34 is provided with a heater 51 and heater 52 services the remainder of the container. Heater 53 is provided around cathode 42. Heating is controlled so that a layer 54 of solidified melt is formed on the inside wall of leg 34 to serve as protection from corrosion.

Hydrogen is continuously introduced through tube 42, and the starting compound to be hydrogenated enters through tube 44. An electric potential is imposed upon electrodes 42 and 48 and the liberated halogen is removed through outlet 50. The liberated alkali or alkaline earth metal is collected on surface zone 39 and combines with the hydrogen entering the container through tube 42. Hydride ions are immediately formed in the melt and, under the influence of the electrical field, migrate to the anode 48. As these hydride ions pass beneath leg 35 on the way to anode 48, they contact the stream of starting compound, for example, silicon chloride, rising from frit 46 and an exchange of hydrogen and halogen atoms occurs. To prevent the hydrogenated product from rising in legs 33 or 34, the lower part 55 of leg 35 is funnel-shaped. As explained, the desired final product is produced continuously and the alkali or alkaline earth hydride is simultaneously reformed.

Figure 4:
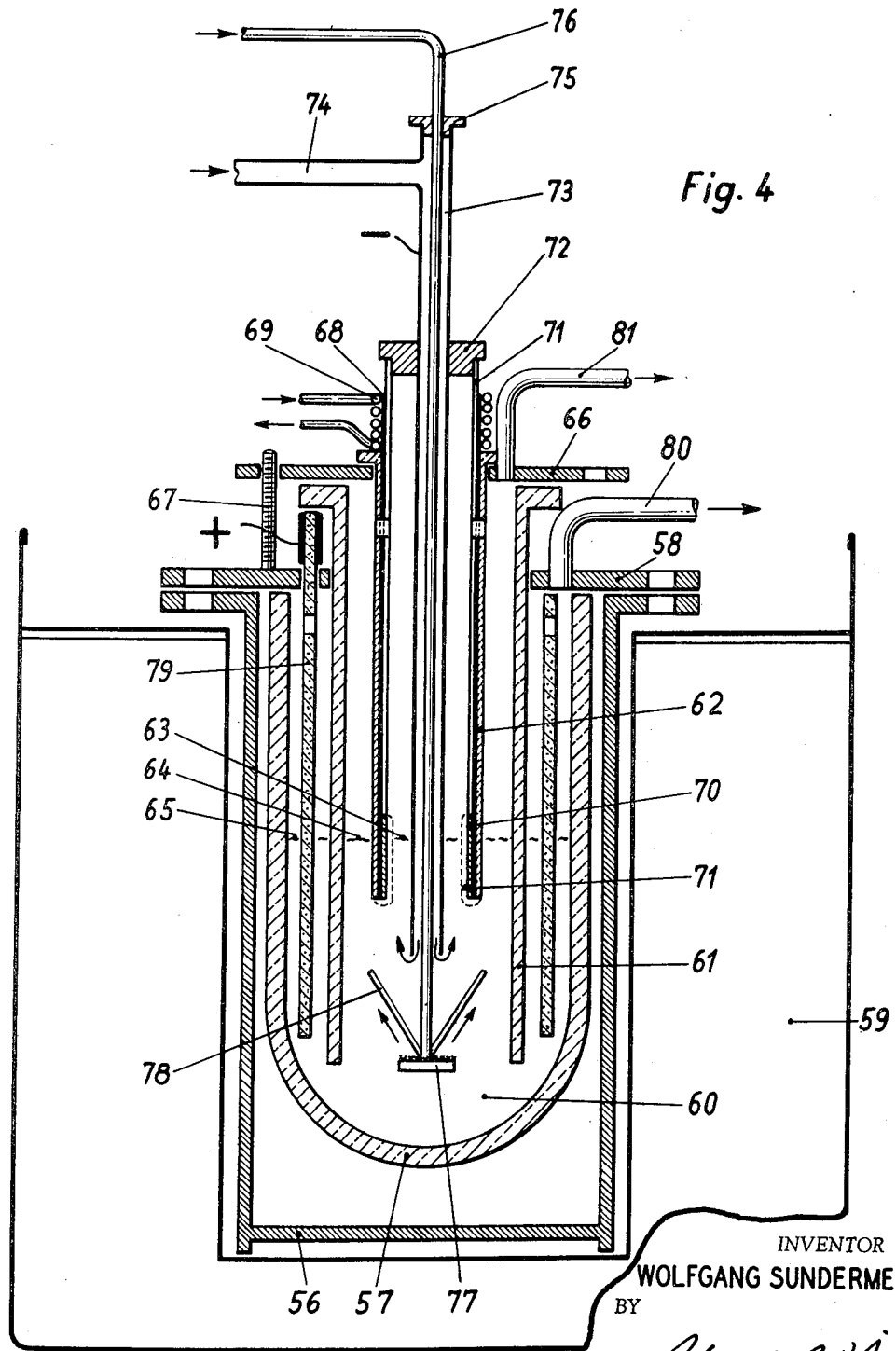
FIG. 4 is a cross-sectional, elevation view of a cylindrical vessel with annular partitions for carrying out the process of the invention continuously.

The apparatus shown in FIG. 4 is also designed for continuous operation. A ceramic container 57 of circular iron section is disposed within an iron outer container 56. The containers are closed by cover 58 and are surrounded by heating device 59. The surface of the melt 60 is divided into an inner circular zone 63, a central annular zone 64 and an outer annular zone 65 by ceramic partitions 61 and 62. Partition 61 extends rather deeply into the container 57, but partition 62 extends only a few centimeters below the surface of the melt. The area above annular zone 64 is enclosed by cover 66, which is spaced away from cover 58 by screws 67. Partition tube 62, which is held by cover 66, has an inner copper tube 68 which is cooled at its upper end by cooling coils 69, through which water may be passed. Tube 68 has a protective layer 70 of tantalum at its lower end and over this the melt solidifies in a layer 71 when the upper part of the tube 68 is cooled. This layer 71 protects against corrosion. The space enclosed by partition 62 is extended upward by tube 71, which is closed by cap 72. A tubular iron cathode 73 passes through cap 72 and has an inlet 74 for the supply of hydrogen. The tube 73 is closed by a cap 75, which holds a partially protected ceramic tube 76, concentrically located in tube 73. Tube 76 is used to introduce the starting compound into the melt through frit 77. A hydrogen compound may serve as a carrier gas. A ceramic distributor 78 extends obliquely upward from frit 77 to prevent starting material from entering zone 63 and reacting with the pure alkali or alkaline earth metal. The starting compound rises into zone 64, and as it does so, it contacts the active hydride ions.

Annular graphite anode 79 is held by cover 58, which has outlet 80 for the removal of the halogen escaping above annular zone 65. The cover 66 is provided with an outlet 81 for removing the hydrogenated product escaping above the zone 64.

The process progresses continuously substantially as was described with reference to FIG. 3. Halogen is liberated at the anode due to the electrolysis and alkali or alkaline earth metal is liberated at the cathode. The metal is hydrogenated by the hydrogen entering through tube 73 and hydride ions form in the melt. On the way to the anode, the hydride ions contact the starting compound rising from frit 77 and the desired conversion is accomplished.

FIG. 5 is a schematically drawn modification of FIG. 4. The primed reference numerals of FIG. 5 correspond to the unprimed numerals of FIG. 4. In this case, however, both partitions 61' and 62' extend deeply into the container 57' so that the melt zones 63', 64' and 65' are well separated from each other. Holes 83 in partition 62' allow hydride ions to pass out of zone 63' on their way to anode 79' and both holes 82 and 83 in partitions 61' and 62', respectively, allow electric field lines to pass between the electrodes in a much shorter path than in the apparatus of FIG. 4.

FIG. 6 is a schematic representation of substantially all apparatus needed to carry out the process of the invention. Assuming that a container 57 is used of the type shown in FIG. 4, electrolytic hydrogen is passed through line 85 to lines 74 and 88 through valves 87 and 86, respectively, which have differing flow resistances. Thus, the hydrogen is sometimes passed to the receiving trap 89 and sometimes directly to the container 57. Hydrogen in the receiving trap 89 is loaded with the starting compound to be hydrogenated, which comes from storage container 90. The hydrogen and starting compound pass through line 76 to container 57. Line 76 and trap 89 may be heated where a starting compound is used which is not sufficiently volatile to be loaded on the hydrogen at room temperature. Bypass line 91 is used to disconnect trap 89 when it is desired to add additional starting compound to the trap 89.

A mixture of hydrogenated product, unconverted starting compound and hydrogen is carried away from container 57 through line 81. This mixture is passed through cooling trap 92, which can consist of a glass coil passing through a carbon dioxide-acetone bath, a small liquid collector for condensed products (usually unconverted starting compound, which is then passed back to the receiving trap 89), and a cooling coil for additional condensation. In another set of traps 93, which may be cooled with liquid nitrogen, hydrogen is separated from the desired hydrogenated product. Two lines, 94 and 95, are needed to operate the process continuously. These lines are in parallel and one set of traps may be in operation while the other set is being emptied. The desired final product is passed through the line 96 and the separated hydrogen is passed through line 97 to a circulating pump 98 and thence back to the hydrogen feed line 85, to be refed into the process.

Liberated halogen is removed from vessel 57 through line 80 and may be used to prepare the starting compound.

Pressure gages 99, 100, 101 and 102 are necessary because the pressure difference between inlet tubes 73 and 76 should be sharply controlled, as must be the pressure difference between the outlet 80 and the anode and cathode space. This is to prevent the melt, because of the excess pressure, from entering one of the lines and solidifying. Equalizing valves 103 make it possible to equalize pressure between the tubes and spaces. Pressure gage 102 permits control over the pressure of the circulating pump 98.

A large number of starting compounds can be hydrogenated by the process of this invention. For example, halogen compounds of silicon, boron and germanium may be hydrogenated to $SiH_4$, $B_2H_6$ and $GeH_4$, which are of industrial interest. It is also possible to produce compounds of the series $SiHX_3$, $SiH_2X_2$, $SiH_3X$, etc. If the starting material contains other organic groups beside the halogen, for example, $CH_3-$, $C_2H_5-$, $C_6H_5-$, etc., it is possible to obtain the corresponding organo silanes, boranes and germanes. It is only necessary that the products are thermally stable at the temperatures used and are sufficiently volatile to escape from the melt. Removal can be accomplished by distillation, if necessary. Even solid materials can be used as starting compounds, for example, $K_2SiP_6$, $K_2Ge_6$, $K_2SiCl_6$, etc. The methyl, ethyl and phenyl-chlorine compounds of silicon have been hydrogenated by this process. Higher compounds of these elements may also be hydrogenated as, for example, hexachlorodisilane to disilane.

The alkali and alkaline earth metals, which may be used should be liquefiable at the temperature used and should be readily hydrogenated. It is possible to use the alkaline earth metals in the solid state. The metal halide to be used in the melt is determined by the type of starting compound. For example, to hydrate chlorine compounds of silicon, it is desirable to use an alkali or alkaline earth chloride in the melt or at least a mixture from which chlorine can be separated by electrolysis. If it is not desired to operate the process continuously an unlimited number of melts and mixtures are available.

The melting temperature of the melt can be lowered by mixing various salts. The additives should have a higher separating potential at the operating temperature than the component to be electrolyzed. It should be noted that the potentials of decomposition vary with temperature, and at low temperature, the usual sequence of separation may be reversed.

A eutectic mixture of lithium chloride and potassium chloride is particularly desirable. An alkaline earth halide which melts at about 359° C. may be added. This addition acts as a hydrogen transfer to the alkali metals.

Low-melting salt mixtures which can be used in the process are:

RbCl—LiCl
KBr—LiBr
KCl—LiCl

SrCl₂—LiCl
CsCl—NaCl
CaCl₂—NaCl
LiBr—LiCl
RbCl—NaCl
KCl—KF
NaCl—NaF
CaCl₂—KCl
SrCl₂—NaCl
BaCl₂—LiCl
AgCl—KCl
AgCl—RbCl
LiCl—NH₄Cl
LiCl—NaCl—CsCl
LiCl—NaCl—RbCl
LiCl—KCl—RbCl
NaCl—KCl—CaCl₂

As an example of the invention, a salt melt eutectic of LiCl—KCl was used having a specific conductivity at 400° C. of 0.733 ohm$^{+1}$. The working current, depending on the apparatus and applied potential was 20 to 60 amperes. The separating potentials are:

|  | LiCl, volts | KCl, volts |
| --- | --- | --- |
| At 400° C | 3.785 | 3.893 |
| At 405° C | 3.777 | 3.839 |

The lithium liberated in the electrolysis floated on the surface of the melt and was converted to lithium hydride by the hydrogen rising in the melt. The following reaction times for complete conversion of the melt were found:

| Lithium in grams | Temperature, °C. | Time of reaction in minutes |
| --- | --- | --- |
| 1.15 | 400 | about 10. |
| 1.1 | 450 | about 8. |
| 1.1 | 500 | about 4. |
| 1.0 | 600 | about 3. |
| 3.0 | 400 | about 15. |
| 5.0 | 400 | about 18–20. |

The time of reaction did not appreciably increase when larger amounts of metal were used if sufficient hydrogen was supplied.

The hydrogenation of sodium and potassium required about three times as much time as lithium. An addition of a slight amount of metallic calcium increased the speed of the reaction.

Where the alkaline earth metal separates out in fine particles and is well distributed in the cathode space, hydrogenation taken place about as fast as the hydrogenation of lithium.

Where reference is made to the periodic table of the elements or periodic system in this specification and following claims, the periodic arrangement found on pages 390 and 391 of the Chemical Rubber Publishing Company "Handbook of Chemistry and Physics," 38th edition (1956–1957), is meant.

I claim:

1. A process for producing a hydride of an element selected from groups IIIA and IVA of the periodic table of the elements comprising:
   (a) reacting a halide of said element with a hydride of a metal selected from the group consisting of alkali and alkaline earth metals to form the corresponding hydride of said element and the corresponding halide of said metal, said reaction being conducted in a melt comprising at least one non-oxidizing salt;
   (b) electrolyzing said melt to decompose said halide of said metal into the metal and halogen;
   (c) and introducing hydrogen into said melt for reaction with said metal as it forms during said electrolyzing step whereby said hydride of said metal is produced for reaction with said halide of said element selected from groups IIIA and IVA of the periodic table.

2. A process according to claim 1, in which at least part of said melt comprises a metal halide identical to that produced by the reaction of said halide of an element of groups IIIA and IVA with said hydride of a metal selected from the group consisting of alkali and alkaline earth metals.

3. A process according to claim 1, in which said melt is a eutectic comprising at least two non-oxidizing salts.

4. A process according to claim 1, in which said halogen produced by said electrolyzing step is reacted with an element of groups IIIA and IVA to form a halide thereof for reaction with the hydride ions in said melt.

5. A process according to claim 1, in which said halide of an element of groups IIIA and IVA is a halide of an element selected from the group consisting of silicon, boron, and germanium and said melt is a mixture selected from the group consisting of rubidium chloride and lithium chloride; potassium bromide and lithium bromide; potassium chloride and lithium chloride; strontium chloride and lithium chloride; cesium chloride and sodium chloride; calcium chloride and sodium chloride; lithium bromide and lithium chloride; rubidium chloride and sodium chloride; potassium chloride and potassium fluoride; sodium chloride and sodium fluoride; calcium chloride and potassium chloride; strontium chloride and sodium chloride; barium chloride and lithium chloride; silver chloride and potassium chloride; silver chloride and rubidium chloride; lithium chloride and ammonium chloride; lithium chloride, sodium chloride, and cesium chloride; lithium chloride, sodium chloride and rubidium chloride; lithium chloride, potassium chloride and rubidium chloride; and sodium chloride, potassium chloride and calcium chloride.

6. A process according to claim 1, in which said halide of an element of groups IIIA and IVA is a halide selected from the group consisting of boron bromide and silicon chloride and said hydride of a metal selected from the group consisting of alkali and alkaline earth metals is lithium hydride and said melt comprises lithium chloride and potassium chloride.

7. A process according to claim 6, in which said halide and said lithium hydride are present in said melt in a molar ratio of less than 4 of lithium hydride to 1 of halide.

8. A process for producing a hydride of an element selected from groups IIIA and IVA of the periodic table of the elements comprising:
   (a) providing an electrolytic system comprising a cathode, an anode, and an electrolyte of at least one molten non-oxidizing salt, said electrolyte containing at least one halide of a metal selected from the group consisting of alkali and alkaline earth metals;
   (b) electrolyzing said halide of said metal to decompose it into the metal and halogen;
   (c) introducing hydrogen into said electrolytic system in the vicinity of said cathode for reaction with said metal as it forms during said electrolyzing step whereby a hydride of said metal is produced;
   (d) introducing a halide of an element selected from groups IIIA and IVA of the periodic table into said electrolyte between said cathode and said anode for reaction with said metal hydride to form the corresponding hydride of said element and the corresponding halide of said metal, said halide of said metal then being electrolyzed to complete a cyclic process; and
   (e) removing said hydride of said element of groups IIIA and IVA from said electrolytic system.

9. A process for producing a hydride of an element selected from groups IIIA and IVA of the periodic table of the elements comprising:
- (a) electrolyzing a non-oxidizing salt melt containing at least one halide of a metal selected from the group consisting of alkali and alkaline earth metals so as to decompose said halide of said metal into the metal and halogen;
- (b) introducing hydrogen into said melt to form hydride ions by reaction with the metal formed by said electrolyzing step; and
- (c) reacting a halide of an element selected from groups IIIA and IVA of the periodic table with said hydride ions to form the corresponding hydride of said element.

References Cited in the file of this patent

UNITED STATES PATENTS

| | | |
|---|---|---|
| 2,596,690 | Hurd | May 13, 1952 |
| 2,741,587 | Sindeband | Apr. 10, 1956 |
| 2,760,930 | Alpert et al. | Aug. 28, 1956 |
| 2,838,454 | Washburn | June 10, 1958 |
| 2,867,568 | Cunningham | Jan. 6, 1959 |